Patented Dec. 8, 1925.

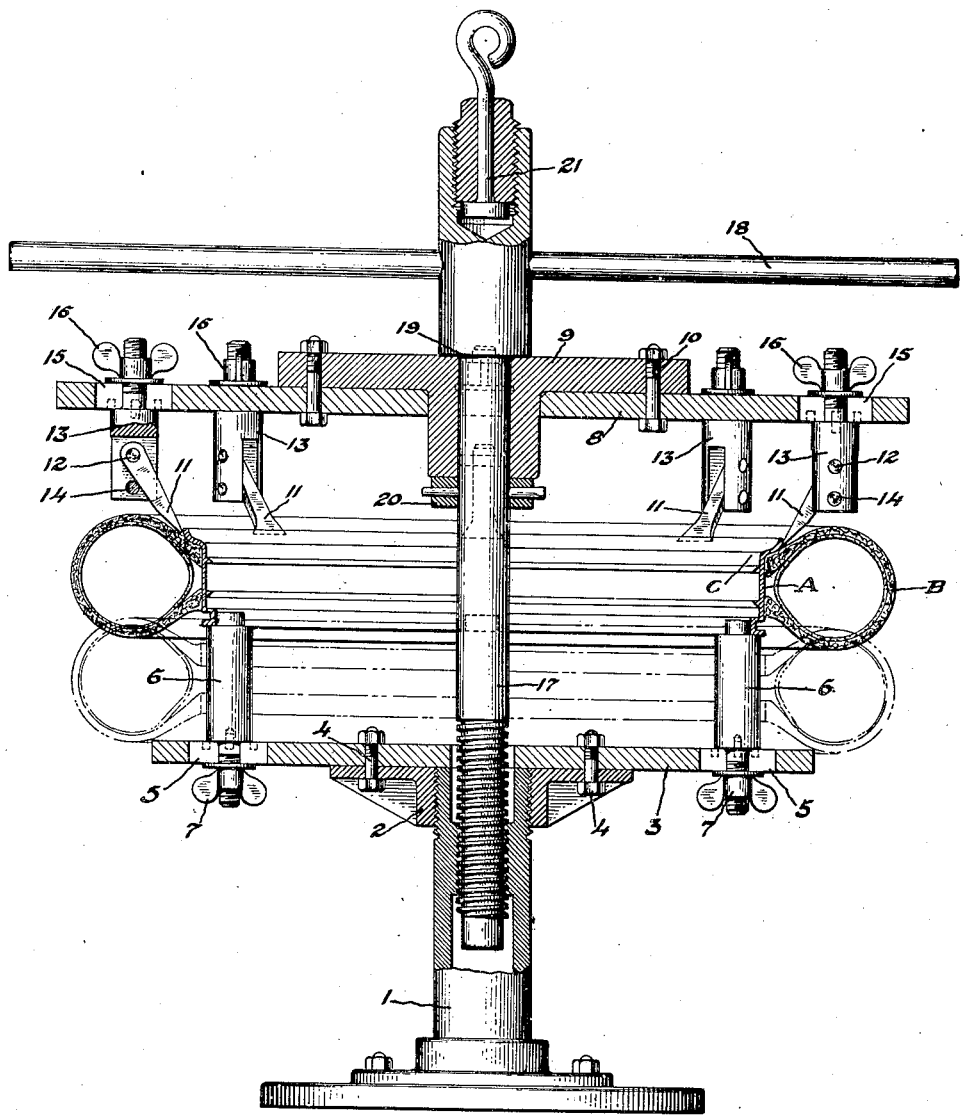

1,564,496

UNITED STATES PATENT OFFICE.

CHRISTIAN STAUGAARD, OF DETROIT, MICHIGAN.

TIRE-REMOVING MECHANISM.

Application filed December 15, 1921. Serial No. 522,585.

*To all whom it may concern:*

Be it known that I, CHRISTIAN STAUGAARD, a citizen of the United States of America, and a resident of Detroit, county of Wayne and State of Michigan, have invented certain new and useful Improvements in Tire-Removing Mechanism, of which the following is a full, clear, concise, and exact description, such as will enable others skilled in the art to which the invention relates to make and use the same, reference being made therein to the accompanying drawings, which form a part of this specification.

My invention consists in a tool, device or appliance designed for use by automobile repairers and others to remove pneumatic or other tires from the rims whereby they are carried, and which often become rusted or otherwise stuck upon the rim to a degree such as to require a very considerable force to effect their detachment and removal thereupon.

The drawing accompanying and forming a part of this specification illustrates the improved tire removing mechanism in which my invention consists in a form which I now regard as the best form thereof; although it will be appreciated that my invention may be embodied in various other forms, all within the scope thereof, so long as such other forms come within the scope of the concluding claims wherein the distinguishing features of my invention are particularly pointed out and claimed.

The drawing shows my invention mostly in section upon a vertical central plane, and illustrates the use thereof.

In the preferred embodiment of my invention illustrated in the drawing the rim —A— having a tire —B— thereupon to be removed is supported in a horizontal or substantially horizontal position by a rim supporting device or base shown as comprising a hollow tubular pedestal designated by the reference numeral 1 the upper end of which is threaded to receive and support a flange 2 to which a face plate or table 3 is secured by bolts 4 or otherwise, and the periphery of which plate extends beneath the tire to be removed so as to catch and support the same as indicated in dotted lines; said table having a plurality of substantially radial slots 5 along which a like number of upwardly extending rim supporting members 6 are adjustable to adapt the mechanism to different sized rims and tires; said members having threaded shanks extending through the slots and upon which wing nuts 7 operate so that said members may be fastened in place at various positions along said slots. The upper ends of these supporting members are suitably formed to engage and support a rim and tire as shown; and they constitute the immediate rim supporting means of the tire removing mechanism illustrated, as will be appreciated.

Co-operating with the rim supporting device thus provided is a tire removing device which is movable downward and toward the base; said tire removing device being shown as comprising a substantially horizontal supporting member or plate 8 secured to a flange 9 by bolts 10 or in an equivalent manner; and which plate carries on its under side a plurality of tire engaging members adapted to engage the tire and force it downward and off from the rim as the tire removing device is moved downward; the preferred arrangement of the said members being such that they engage the tire close to the rim and to the inner base portion of the tire.

The tire engaging members which obviously form the immediate tire removing means of the mechanism are shown as wedges 11 the upper ends of which are pivotally supported at 12 in bifurcated stirrups 13, and the lower free ends of which enter in between the side flange —C— of the rim to thereby engage the tire close to the base and act more effectively thereupon during the removing operation; to which end the wedges are arranged in inclined positions with their lower free ends the closer to the axes of the tire and rim, and are free to swing inward during the tire removing operation to an extent limited by engagement of their free ends with the cylindrical portion of the rim upon which the tire rests. Stop pins 14 are preferably provided to limit the outward swinging of the wedges and position them so that they will engage the tire at the proper points as the tire removing device is moved toward the rim supporting device, as will be appreciated.

The stirrups 13 like the rim supporting members 6 are made adjustable to adapt the mechanism to different sized rims and tires to which end said stirrups are provided with threaded shanks movable along substantially radial slots 15 in the plate 8, and with wing nuts 16 whereby the shanks may be secured in various positions along the slots. The shoulders at the lower ends of the members 6 and at the upper ends of the stirrups 13 may, if desired, be provided with projections, such as dowel pins, arranged to enter holes spaced along the sides of the slots to thus definitely position the said members, as indicated in dotted lines.

The tire removing device above described in forced downward and toward the rim supporting device in the embodiment of my invention illustrated by means of a centrally located screw 17 having a capstan bar 18 at its upper end for turning the same, and the lower end of which engages a thread within the pedestal 1. The flange plate 9 has a bearing within which this screw rotates, and collars at 19, 20 upon the screw prevent independent longitudinal movement thereof and cause the said plate and the entire tire removing device to move in a right line as the screw is rotated. Obviously, the screw and tire removing device have to be removed from, or at least lifted some distance above the base, to permit a rim and tire to be slid beneath the lower end of the screw and placed upon the rim supporting members 6; to which end a swivel 21 is provided at the upper end of the screw so that the screw and tire removing device, after the screw has been disengaged from its nut within the pedestal 1, may be lifted by a suitable tackle block or similar contrivance, as the screw and tire removing device are quite heavy.

Having thus described and explained my invention, I claim and desire to secure by Letters Patent:

1. In tire removing mechanism of the class described, a rim supporting device; a tire removing device having a plurality of pivotally supported tire engaging members spaced apart from one another and having free ends adapted to engage a tire carried by a rim; and means for moving one of said devices relative to the other and in a direction at right angles to the planes of said tire and rim.

2. In tire removing mechanism of the class described, a rim supporting device; a tire removing device having a plurality of inclined pivotally supported tire engaging members spaced apart from one another and having free ends adapted to engage a tire carried by a rim at points adjacent the rim, and the free ends of which members are disposed closer to the axes of the tire and rim than the pivots whereby said members are supported; and means for moving one of said devices toward the other at right angles to the planes of said tire and rim.

3. In tire removing mechanism of the class described, a base having rim engaging means adapted to support a rim from which a tire is to be removed; a tire removing device located above said base and comprising a supporting member or plate, and a plurality of pivotally supported tire engaging members carried by said plate and spaced apart from one another and the free ends of which are adapted to engage the tire at a corresponding number of points adjacent the rim; and means including a screw which is centrally located relative to the rim and tire operated upon for forcing said tire removing device toward said base.

4. In tire removing mechanism of the class described, a base having rim engaging means adapted to support a rim from which a tire is to be removed; a tire removing device located above said base and comprising a supporting member or plate, a plurality of stirrups located beneath said plate, and a corresponding number of downwardly and inwardly inclined tire engaging members pivotally secured at their upper ends to said stirrups, and the lower ends of which are adapted to engage the tire at points adjacent the rim; and means including a screw which is centrally located relative to the rim and tire operated upon for forcing said tire removing device toward said base.

In testimony whereof I affix my signature.

CHRISTIAN STAUGAARD.